United States Patent [19]

Uchihara et al.

[11] 4,353,600
[45] Oct. 12, 1982

[54] NON-LINKAGE TYPE LOAD SENSING VALVE

[75] Inventors: Tatsuo Uchihara, Yokosuka; Tadao Takimoto, Yokohama; Junichi Fujimoto, Yokohama; Katuhiro Morita, Yokohama; Hitoshi Kubota, Fujisawa, all of Japan

[73] Assignee: Nissan Motor Co., Ltd., Yokohama, Japan

[21] Appl. No.: 155,259

[22] Filed: Jun. 2, 1980

[30] Foreign Application Priority Data

Jun. 5, 1979 [JP] Japan .................................. 54-69381

[51] Int. Cl.³ .............................................. B60T 8/14
[52] U.S. Cl. ...................................... 303/24 F; 303/66
[58] Field of Search ................ 303/6 C, 24 A, 24 BB, 303/24 C, 24 F

[56] References Cited

U.S. PATENT DOCUMENTS

| 3,006,696 | 10/1961 | Yarber | 303/24 F |
| 3,922,020 | 11/1975 | Koike et al. | 303/6 C |
| 4,113,318 | 9/1978 | Dol | 303/24 F |
| 4,251,117 | 2/1981 | Kubota et al. | 303/24 F |
| 4,253,707 | 3/1981 | Takata | 303/24 C X |

Primary Examiner—Duane A. Reger
Attorney, Agent, or Firm—Thompson, Birch, Gauthier & Samuels

[57] ABSTRACT

In a load sensing valve including a proportioning valve (P-valve) and a deceleration sensing valve (G-valve), a compensating device is installed for varying the volume of the fluid sealing chamber of the G-valve in accordance with the magnitude of sealed hydraulic pressure in the fluid sealing chamber when the sealed hydraulic pressure is lower than a predetermined valve to change the pressure controlling characteristic of the proportioning valve.

15 Claims, 8 Drawing Figures

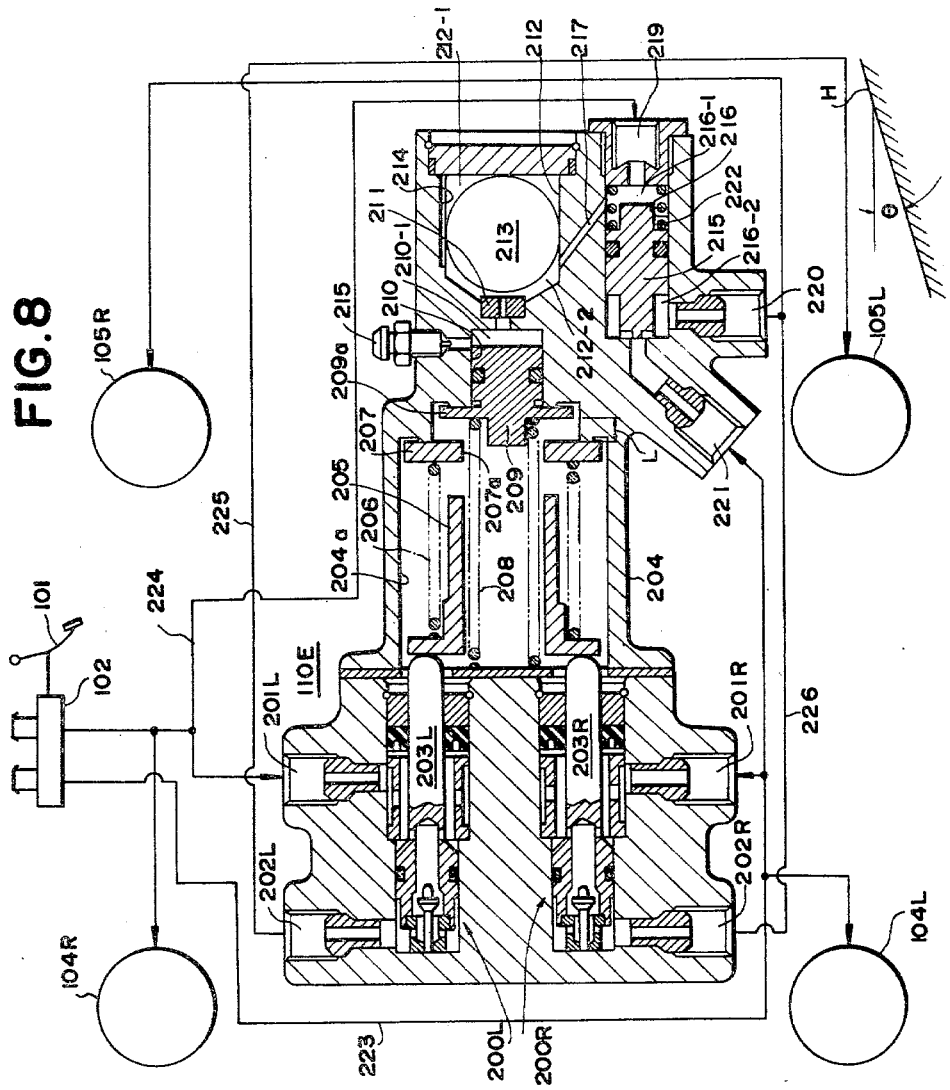

4,353,600

NON-LINKAGE TYPE LOAD SENSING VALVE

FIELD OF THE INVENTION

The present invention relates in general to an anti-skid braking system for a vehicle, and more particularly to a non-linkage type load sensing valve.

SUMMARY OF THE PRESENT INVENTION

According to the present invention, there is provided a load sensing valve for a hydraulic brake system for a vehicle. The valve comprises a proportioning valve for controlling the hydraulic pressure in a fluid outlet port thereof in response to the application of hydraulic pressure to a fluid inlet port thereof, a deceleration sensing valve for changing the pressure controlling characteristic of the proportioning valve in accordance with the magnitude of the sealed hydraulic pressure in a fluid sealing chamber, the sealed hydraulic pressure being variable in accordance with the amount of deceleration of the vehicle, and a compensating device for varying the volume of a space communicating with the fluid sealing chamber in accordance with the magnitude of the sealed hydraulic pressure when the sealed hydraulic pressure is lower than a predetermined valve to change the pressure controlling characteristic of the proportioning valve.

It is an object of the present invention to provide an improved non-linkage type load sensing valve which controls the front and rear wheel brake pressure distribution characteristic under variable vehicle loading conditions.

It is another object of the present invention to provide an improved non-linkage type load sensing valve which, when braking under light vehicle loading, the sealed pressure provided by the G-valve is adequate to safely brake the vehicle, while upon braking under a heavy load, the sealed pressure increases to safely brake the vehicle.

It is still another object of the present invention to provide an improved non-linkage type load sensing valve which prevents the rear wheels from locking even when the brake pedal is rapidly depressed.

Other objects and advantages of the present invention will be apparent from the following description when taken in conjunction with the accompanying drawings.

BRIEF DESCRIPTION OF THE DRAWINGS

FIG. 8 is a sectional view of the load sensing valve of the fifth embodiment of the present invention.

DESCRIPTION OF PRIOR ART

Prior to describing in detail the construction of the non-linkage type load sensing valve according to the present invention, explanation of a conventional valve will be made with reference to FIG. 1 in order to clarify the invention.

Figure 1:
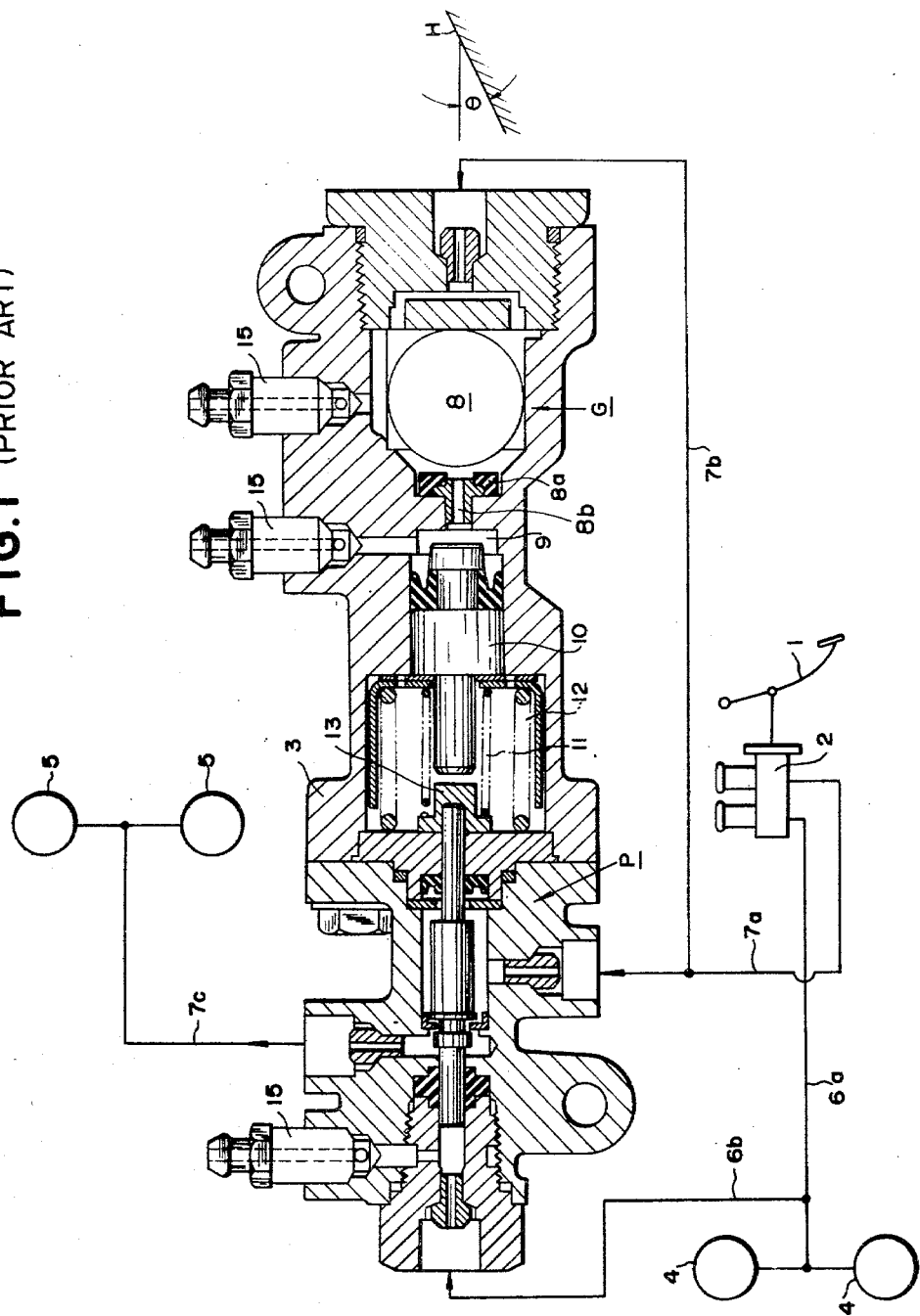
FIG. 1 is an automotive anti-skid braking system utilizing a conventional non-linkage type load sensing valve.

Referring to FIG. 1 of the drawings, there is shown an automotive anti-skid braking system utilizing a conventional non-linkage type load sensing valve. In this drawing, reference numerals 1, 2 and 3 denote respectively a brake pedal, a master cylinder producing a hydraulic pressure in response to depression of the brake pedal 1, and the conventional non-linkage type load sensing valve. Numerals 4 and 5 denote respectively front wheel brake cylinders and rear wheel brake cylinders. Numerals 6a, 6b, 7a, 7b and 7c denote fluid lines for providing fluid communication between the master cylinder 2, the sensing valve 3 and the front and rear wheel brake cylinders 4 and 5. Numerals 8, 9 and 10 denote a G-ball, a fluid sealing chamber and an actuating piston which form part of a deceleration sensing valve (G-valve). Numerals 11, 12, 13 and 14 denote respectively an inner spring, an outer spring, a spring seat and a plunger which form part of a proportioning valve (P-valve). Numerals 15 designate air bleeding valves. The non-linkage type load sensing valve outlined above is clearly described in U.S. Pat. No. 3,922,020.

In the anti-skid braking system mentioned above, when the brake pedal 1 is depressed sufficiently, the master cylinder 2 produces hydraulic pressure applied to the front wheel brake cylinders 4 via the fluid line 6a and hydraulic pressure applied to the rear wheel brake cylinders 5 via the fluid line 7a, the sensing valve 3 and the fluid line 7c, thereby to brake the vehicle. When the vehicle deceleration exceeds a predetermined value, determined by an inclination angle "$\theta$" of the sensing valve with respect to the vehicle axis H, the G-ball 8 moves leftwardly in the drawing to close a passage 8b formed in a valve seat 8a, sealing fluid in the fluid sealing chamber 9 therein. In proportion to the magnitude of the pressure of the sealed fluid in the chamber 9, the piston 10 moves leftwardly against the forces produced by the inner and outer springs 11 and 12, compressing the spring 11, thereby changing the critical hydraulic pressure ($P_s$) within the proportioning valve P. The critical pressure $P_s$ is defined as the pressure at which the ratio of master cylinder hydraulic pressure and rear wheel braking hydraulic pressure changes. Since vehicle deceleration is inversely proportional to the load on the vehicle, it will be understood that the critical hydraulic pressure $P_s$ determined by the force exerted by the inner spring 11 increases as the load on the vehicle increases.

Figure 2:
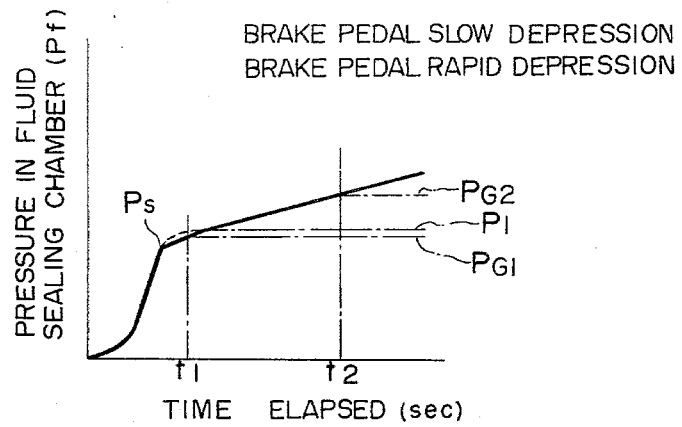
FIG. 2 is a graph depicting the characteristics of the conventional valve shown in FIG. 1.

However, in the above-mentioned conventional load sensing valve, the following drawbacks are encountered:

(a) As will be understood from the graph of FIG. 2, it is difficult to obtain a clearly defined difference in magnitude between a sealed pressure $P_{G1}$ when the vehicle is under light loading and a sealed pressure $P_{G2}$ when the vehicle is under heavy loading. Therefore, the load sensing valve has a considerably limited pressure controlling characteristic.

(b) When the brake pedal 1 is depressed rapidly, the sealed pressure $P_1$ in the chamber 9 which causes movement of the piston 10 in the leftward direction increases as shown by a broken line in FIG. 2. Therefore, upon rapid depression of the brake pedal the sealed pressure under light vehicle loading becomes higher than a predetermined level. Thus, the hydraulic pressure applied to the rear wheel brake cylinders 5 is abnormally increased so that the rear wheels are likely to lock.

DESCRIPTION OF THE PREFERRED EMBODIMENTS

Figure 3:
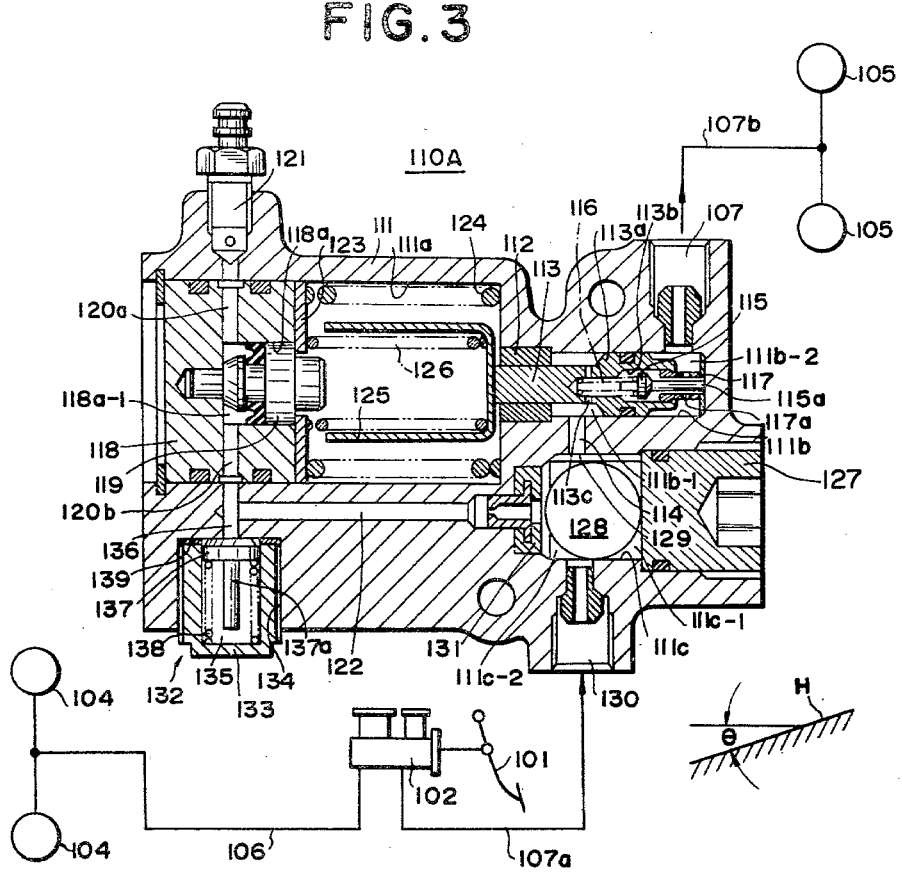
FIGS. 3 to 6 are sectional views of the load sensing valves of the first, second, third and fourth embodiments according to the present invention.

Referring to FIG. 3, there is shown an anti-skid braking system utilizing an improved non-linkage type load sensing valve 110A of the first embodiment according to the present invention.

In the drawing, reference numeral 102 denotes a tandem master cylinder actuated by a brake pedal 101. Front wheel brake cylinders 104 are connected via a fluid line 106 to the front fluid chamber of the master cylinder 102; rear wheel brake cylinders 105 are connected to the rear fluid chamber of the master cylinder via fluid lines 107b and 107a and the improved non-linkage type load sensing valve 110A. The load sensing valve 110A of this embodiment comprises a body 111 having therein a cylindrical chamber 111a, a smaller blind cylindrical chamber 111b concentric therewith, and another cylindrical chamber 111c parallel thereto. Screwed to the open end of the blind chamber 111b is an annular guide member of sleeve 112 which slidably supports a plunger 113 coaxially received in the chambers 111a and 111b so as to be axially movable therein. The plunger 113 includes a land 113a formed at a section thereof within the blind chamber 111b. The land 113a sealingly engages the cylindrical wall of the blind chamber 111b to divide the chamber into first and second sections 111b-1 and 111b-2, as shown. The section 111b-1 is isolated from the chamber 111a by the annular guide member 112, but communicates with the chamber 111c through a passage 114. The section 111b-2 communicates with a fluid outlet port 107.

The plunger 113 includes an axial blind chamber 113b opening toward the second section 111b-2 of the blind chamber 111b. In the blind chamber 113b is arranged a poppet valve 115 which is biased to move rightwardly by a pre-loaded spring 116 positioned therein. A cylindrical valve seat 117 is positioned within the blind chamber 113b to engage the poppet valve 115 to seal the blind chamber from the chamber 111b-2. The valve seat 117 is formed with openings 117a for providing communication between the blind chamber 113b and the blind chamber second section IIIb-2. The poppet valve 115 includes a valve stem 115a so constructed to engage the end wall of the blind chamber 111b and open the poppet valve. The blind chamber 113b of the plunger 113 constantly communicates with the blind chamber first section 111b-1 through passages 113c formed in the plunger. Thus, when the poppet valve stem 115a contacts the bottom wall of the blind chamber 111b, the poppet valve 115 opens to establish communication between the second section 111b-2 and the first section 111b-1 through the openings 117a, the blind chamber 113b and the passages 113c.

The left end of the cylindrical chamber 111a is closed by a sealing plug 118 formed with a blind chamber 118a opening into the chamber 111a. A piston 119 is disposed in the blind chamber 118a to define an operating chamber 118a-1 between the piston 119 and the bottom of the chamber 118a. This piston 119 has a smaller pressure surface area than its counterpart 10 of the prior art device of FIG. 1. Two passages 120a and 120b are formed in the sealing plug 118 to communicate with the operating chamber 118a-1, extending radially outwardly therefrom. An air bleed valve 121 is screwed to the body 111 to communicate with the passage 120a. A passage 122 is formed in the body 111 to connect the passage 120b with the chamber 111c.

A spring seat 123 with a central opening (no numeral) is movably disposed in the cylindrical chamber 111a. An outer spring 124 is arranged and compressed between the spring seat 123 and the bottom wall of the chamber 111a to bias the spring seat leftwardly as shown in the drawing.

A spring seat 125 in the form of a cup is disposed in the chamber 111a and fixed at its bottom wall to the left end of the plunger 113. An inner spring 126 is arranged and compressed between the bottom wall of the spring seat 125 and the spring seat 123.

The right end of the chamber 111c is sealed with a plug 127. The chamber 111c receives a ball 128 which divides the chamber into first and second sections 111c-1 and 111c-2. These sections communicate with each other by an axially extending groove 129 formed in the cylindrical wall of the chamber 111c. The valve body 111 includes a fluid inlet port 130 communicating with the second section 111c-2 of the chamber 111c. The chamber 111c includes a valve seat 131 for sealing against the ball 128 to close the communication between the chamber and the passage 122.

As shown in the lower left section of the load sensing valve 110A of FIG. 3, a compensating device 132 is installed in the body 111. The compensating device 132 comprises a cup-shaped case 133 threaded into a bore 134 formed in the body 111. A passage 136 is formed in the body 111 to connect the passage 120b open to the operating chamber 118a-1 with a chamber 135 in the case 133. A piston 137 is disposed in the chamber 135, and a spring 138 is arranged and compressed between the piston and the bottom wall of the case 133 to bias the piston against the end wall of the bore 134. This spring 138 provides a compressive force much smaller than the sum of the forces of the inner and outer springs 126 and 124, acting indirectly against the piston 119. Therefore, under the application of an increasing fluid pressure, the piston 137 will shift prior to the piston 119. The piston 137 has a stem 137a for limiting the travel thereof. Under an increasing fluid pressure, the stem 137a will cause the piston 137 to "bottom out" before the pressure increases sufficiently to overcome the force of the springs 124 and 126 to shift the piston 119. A sealing ring 139 is disposed between the open end of the case 133 and the bottom wall of the bore 134 to insure a fluid-tight seal therebetween.

Prior to describing the function of the compensating device 132, the operation of the proportioning valve (P-valve), generally comprising the plunger 113, the poppet valve 115 and the spring 126, and the deceleration sensing valve (G-valve), generally comprising the ball 128, the piston 119 and the spring seat 123, will be explained.

When the load sensing valve 110A is mounted on the vehicle body, it is inclined at an angle "$\theta$" with respect to the vehicle axis H so that normally the ball 128 rests against the plug 127 under its own weight, as shown in FIG. 3. Additionally, under normal operating conditions, the compensating device 132, the decelerating sensing device, the piston 119, the plunger 113 and the poppet valve 115 remain in the position shown in FIG. 3.

Figure 7:
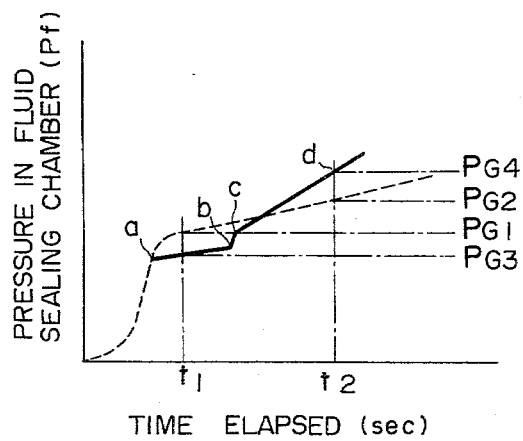
FIG. 7 is a graphic comparison of the characteristics of the load sensing valve of the present invention and the conventional load sensing valve of FIG. 1.

FIG. 7 shows a comparison of the characteristics of the valve of the present invention and that of the conventional valve of FIG. 1 by showing the relationship between the pressure ($P_f$) in the fluid sealing chamber such as the chamber 118a-1 and the elapsed time for which the pressure ($P_f$) continues to increase upon depression of the brake pedal. The characteristic of the valve of the present invention is shown by the heavier solid line a-b-c-d, while the characteristic of the conventional valve is shown by the lighter broken line.

Under normal operating conditions, the ball 128 rests against the plug 127, permitting fluid flow through the valve seat 131. In response to depression of the brake pedal 101, the master cylinder 102 produces a hydraulic pressure $P_f$ to the braking system of both the front and rear wheels. This pressure $P_f$ is transmitted through the first chamber section 111c-2, the valve seat 131, the passages 122, 136 and 120b, and into the fluid pressure sealing chamber 118a-1. When the presssure $P_f$ reaches point "a," on the graph of FIG. 7, the piston 137, being opposed by a smaller compression spring force than that of the piston 119, begins to move against the spring 138, the piston 119 remaining stationary. As the pressure $P_f$ further increases, the piston 137 moves downward increasing the volume of the chamber defined by the case 133 above the piston. Thus, $P_f$ increases at a relatively lower pressure rate as indicated by line a-b. When the pressure $P_f$ reaches the point "b," the piston stem 137a contacts the bottom of the cup-shaped case 133, thus preventing further increase of fluid chamber volume. Under this condition, the pressure $P_f$ increases rapidly as indicated by line b-c. When the pressure $P_f$ increases sufficiently to overcome the force exerted by the inner and outer springs 126 and 124, the pressure urges the piston 119 rightwardly to increase the volume of the chamber 118a-1. As this volume increases, the pressure $P_f$ increases at a lower rate as shown by line c-d.

Simultaneously, the pressure $P_f$ indicated by line a-b-c-d of FIG. 7 is exposed to the blind chamber 111b through the passage 114, where, under normal operating conditions, it ($P_f$) is transmitted through the passage 113c of the plunger 113, the blind chamber 113b, the openings 117a of the valve seat 117, the outlet port 107 and to the rear wheel brake cylinders 105.

Under a no-braking condition, this pressure $P_f$ is the same to both the front and rear wheel cylinders 104 and 105. As this pressure $P_f$ increases under brake pedal depression as described hereinabove, such pressure within the blind chamber 111b-1 results in a force acting upon the plunger 113 to overcome the force of the spring 126, thus shifting the plunger to the left until the spring seat 125 contacts the spring seat 123. Prior to the spring seats 125 and 123 "bottoming out" against one another however, the valve seat 117 engages the poppet valve 115 to close it to further fluid flow therethrough to the rear wheel cylinders 105. The hydraulic pressure at this instant is the critical hydraulic pressure $P_s$, the pressure at which the ratio of the master cylinder hydraulic pressure and rear wheel cylinder hydraulic pressure changes.

As the master cylinder pressure $P_f$ further increases along line c-d of FIG. 7, it overcomes the force of the spring 124, urging the piston 119, spring seats 123 and 125 and plunger 113, as a unit, to the right. As this occurs, the poppet valve stem 115a engages the end wall of the blind chamber 111b to again, open the poppet valve to fluid flow therethrough, thereby permitting the application of the master cylinder pressure $P_f$ through the sensing valve 110A to the rear wheel cylinders 105 at the lower rate of increase, as shown by line c-d of FIG. 7.

From the description of the sensing valve of the present invention 110A thus far, it will be appreciated that the compressive force of the spring 126 is a major factor in determining critical hydraulic pressure $P_s$. The G-valve regulates the effect of this spring force as follows.

Upon rapid deceleration, the G-valve 128 shifts leftwardly to close the passage 122 causing the fluid in the chamber 118a-1 to be sealed therein and immunizing the chamber to the effects of further increases in master cylinder fluid pressure $P_f$. Such further pressure increase, however, acts on the plunger 113 to urge it leftwardly against the force of the spring 126 until the spring seats 123 and 125 bottom out against one another, as explained hereinabove. As should be obvious to those skilled in the art, the critical pressure $P_f$ thus determined when the G-valve has sealed the chamber 118a-1 against the effect of further master cylinder pressure increase is less than the critical pressure determined when the pressure within the chamber 118a-1 has increased to shift the piston 119 to the right, thus increasing the compressive force of the spring 126, which in turn, regulates the critical pressure $P_s$.

In the graph of FIG. 7, $t_1$ represents the time when the G-ball 128 or 8 is brought into contact with the valve seat 131 or 8a to seal the fluid sealing chamber 118a-1 or 9 in the case of light vehicle loading; $t_2$ represents the time when the G-ball seals the chamber in the case of heavy vehicle loading. Thus, it will be appreciated that $P_{G3}$ and $P_{G1}$ represent respectively, the sealed pressure in the fluid sealing chamber 118a-1 of the valve of the present invention and that in the chamber 9 of the conventional valve of FIG. 1 in the case of light vehicle loading, and $P_{G4}$ and $P_{G2}$ represent corresponding pressures in the case of heavy vehicle loading. By comparing the pressure difference between $P_{G3}$ and $P_{G4}$ with that between $P_{G1}$ and $P_{G2}$, it will be appreciated that according to the present invention, a considerably greater difference in magnitude between the sealed pressure $P_{G3}$ at light vehicle loading and the sealed pressure $P_{G4}$ at heavy vehicle loading is obtained. Therefore, the load sensing valve of the present invention has a considerably wider pressure controlling characteristic than the conventional load sensing valve of FIG. 1.

Figure 4:
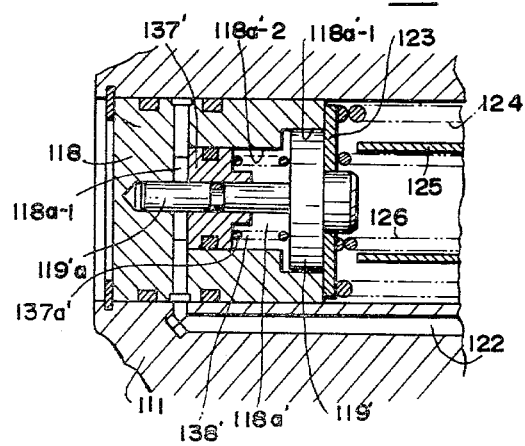

Referring to FIG. 4, there is shown a modification 110B of the load sensing valve of the present invention. As shown in the drawing, a blind passage 118a' of the sealing plug 118 consists of a first section 118a'-1 of larger diameter which receives a piston 119', and a second section 118a'-2 of smaller diameter which receives a piston 137'. The piston 137' has a central bore (no numeral) for receiving a stem 119'a of the piston 119'. Additionally, the piston 137' includes a stem 137a for "bottoming out" against the piston 119' to function identically to the compensating device 132 of the first embodiment. A spring 138' is arranged and compressed between the piston 119' and the piston 137' to bias these pistons in opposite directions. As in the spring 138 of the compensating device 132 of the first embodiment, the spring 138' permits the piston 139' to shift prior to the piston 119'. Note that the embodiment of FIG. 4 does not include a compensating device 132, that function being performed by the piston 137'-spring 138'-piston 119' arrangement. Those skilled in the art will readily recognize that the operation of the embodiment of FIG. 4 is identical to that of FIG. 3.

Figure 5:
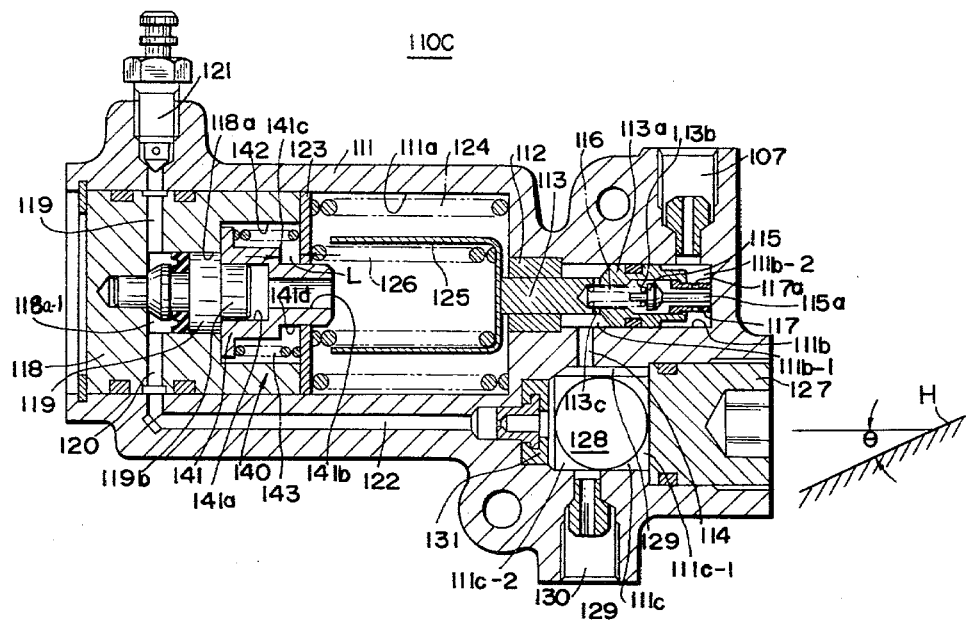

Referring to FIG. 5, there is shown a third embodiment 110C of the present invention, comprising generally the same parts as in the case of the first embodiment 110A of FIG. 3 except that the compensating device 140 is positioned within the sealing plug 118, as in the device of FIG. 4. As shown, the compensating device 140 comprises a piston 141 received in a bore 142 formed in the plug 118. The piston 141 includes a bore 141a for receiving a cylindrical projection 119b of the piston 119, and a smaller diameter bore 141b providing communication between the bore 141a and the chamber 111a. The piston 141 has a reduced diameter section 141d projecting into the chamber 111a through the central opening of the spring seat 123. An annular stepped portion 141c is spaced from the spring seat 123a distance "L". As those skilled in the art will readily recognize, this annular stepped portion 141c functions identically to the stem 137a of the device of FIG. 3 and the stem 137a' of the FIG. 4 embodiment to limit the travel of the piston 141. A spring 143 is arranged and compressed between the piston 141 and the spring seat 123 to bias the piston and spring seat in opposite directions. As in the previously explained embodiments, the spring 143 is selected to permit the pistons 119 and 141 to shift prior to the spring seat 123. Those skilled in the art will recognize that the operation of the embodiment of FIG. 5 is identical to that of the FIGS. 3 and 4 embodiments.

Figure 6:
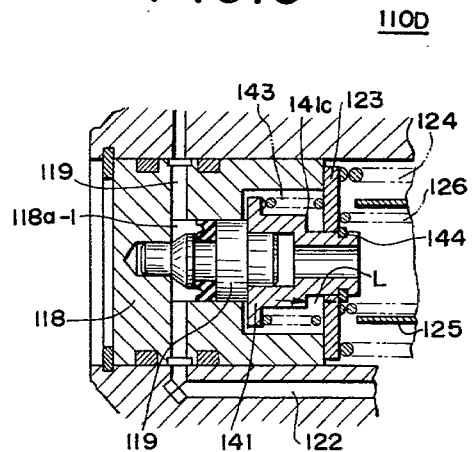

FIG. 6 shows the fourth embodiment of the present invention, which is a slight modification of the third embodiment. In the load sensing valve 110D of the fourth embodiment, the left-most position of the piston 141 is determined by a snap ring 144 mounted on the reduced diameter section 141d of the piston 141 for setting a maximum distance "L" the piston travels with respect to the spring seat 123.

Although, the above-mentioned four embodiments are of a type employed in a hydraulic braking system in which the front wheel braking system and the rear wheel braking system are independent of each other, the device of the present invention is also adaptable to a so-called X-junction type braking system in which the front-right wheel brake and rear-left wheel brake form one braking system, and the front-left wheel brake and rear-right wheel brake form the other braking system.

FIG. 8 shows a fifth embodiment of the present invention designed to be used with such X-junction system. The load sensing valve 110E of this embodiment comprises two parallel proportioning valves 200L and 200R, the valve 200L controlling the hydraulic pressure applied to the rear-left wheel brake cylinder 105L, and the valve 200R controlling the hydraulic pressure applied to the rear-right wheel brake cylinder 105R. The valve 200L has an inlet port 201L and an outlet port 202L, the valve 200R has an inlet port 201R and an outlet port 202R. Each proportioning valve has substantially the same construction as the proportioning valve of the first embodiment of FIG. 3, and functions in a manner identical thereto. Also, the compensating valve of the device of FIG. 8 is very similar to, and functions identically to the embodiment shown in FIG. 5, except that the spring 208 urging the piston 209 toward its seated position (toward the right) provides a constant force, unlike the spring 143 of the FIG. 5 device, which force is a function of the master cylinder pressure $P_f$ within the proportioning valve and the decelerating sensing valve.

As shown in FIG. 8, plungers 203L and 203R of the respective valves 200L and 200R project into a spring receiving chamber 214a formed in a body 214, and the projected head portions contact a common spring seat 205 in the chamber 204a. A spring 206 is arranged and compressed between the spring seat 205 and a spring seat 207 movable in the chamber 204a to bias these spring seats in opposite directions. The spring seat 207 has a central opening 207a through which a spring 208 is arranged and compressed between the left hand wall of the chamber 204a and a flange section 209a of a piston 209. The piston 209 is disposed in a bore 210 to form a fluid sealing chamber 210-1. The piston 209 may move a distance "L" before engaging the spring seat 207. The spring constant of the spring 208 is lower than that of the spring 206.

The fluid sealing chamber 210-1 communicates with a ball receiving chamber 212 through a passage (no numeral) formed in a valve seat 211. A ball 213 is positioned within the chamber 212 to divide it into first and second sections 212-1 and 212-2. A groove 214 connects these two sections 212-1 and 212-2.

In the body of the load sensing valve 110E is provided a switching valve which comprises a piston 215 disposed in a bore 216. The bore 216 is thus divided by the piston 215 into first and second sections 216-1 and 216-2. The first section communicates with the second section 212-2 through a passage 217. The first section 216-1 of the bore 216 is open to an inlet port 219, and the second section 216-2 is open to both an inlet port 221 and an outlet port 220, as shown. A spring 222 is arranged and compressed between the piston 215 and the right hand wall of the bore 216 to bias the piston in a direction to close the communication between the inlet port 221 and the outlet port 220.

The front fluid chamber (no numeral) of the master cylinder 102 is connected via a fluid line 223 to the brake cylinder 104L of the front-left wheel, the inlet port 201R of the proportioning valve 220R and the inlet port 221 of the switching valve; the rear fluid chamber of the master cylinder 102 is connected via fluid line 224 to the brake cylinder 104R of the front-right wheel, the inlet port 201L of the proportioning valve 200L the inlet port 219 of the switching valve. The outlet port 202L of the proportioning valve 220L is connected via a fluid line 225 to the brake cylinder 105L of the rear left wheel; the outlet port 202R of the proportioning valve 200R is connected via a fluid line 226 to the brake cylinder 105R of the rear-right wheel and the outlet port 220 of the switching valve.

The switching valve provides the braking system with a so-called fall-safe function as is described hereinbelow. When the front-right wheel brake cylinder 104R and the rear-left wheel brake cylinder 105L fall to operate causing the hydraulic pressure in the inlet port 219 of the switching valve to be abnormally lowered, the piston 215 is moved rightwardly to open the communication between the inlet port 221 and the outlet port 220, resulting in the hydraulic pressure produced in the front fluid chamber of the master cylinder 102 being directly supplied via the second section 216-2 of the switching valve to the front-left wheel brake cylinder 104L and the rear-right wheel brake cylinder 105R, bypassing the proportioning valve 200R. Because the hydraulic pressure provided by the proportioning valve 200R upon failure of the front-right and rear-left wheel brake cylinders does not increase to effectively brake the front-left and rear-right wheels, the above-mentioned direct introduction of hydraulic pressure to the brake cylinders of those wheels in necessary. When the front-left wheel brake cylinder 104L and the rear-right wheel brake cylinder 105R fail to operate causing the hydraulic pressure in the inlet port 221 of the switching valve to be abnormally lowered, the piston 215 remains at its left-most position, maintaining communication between the second section 212-1 of the ball chamber 212 and the inlet port 219 of the switching valve. Under this failure, however, the G-valve operates normally, so that upon braking of the vehicle, a large amount of brake fluid is fed into the fluid sealing chamber 210-1 of the compensating device, thereby shifting the piston 209 leftwardly to contact and move the spring seat 207 to compress the spring 206 so that the proportioning valve 220L provides the rear-left wheel brake cylinder 105L with a sufficiently high critical hydraulic pressure.

The following is directed to operation of the load sensing valve 110E with respect to the compensating device under normal operation of the brake system.

When the pressure $P_f$ in the fluid chamber 210-1 reaches the point "a" (see FIG. 7), the piston 209 begins to move leftwardly toward the spring seat 207 against the force produced by the spring 208. When the pressure $P_f$ further increases, the piston 209 continues to move increasing the volume of the chamber 210-1, thereby causing the pressure $P_f$ to increase with the characteristic shown by a-b in the graph of FIG. 7. When the pressure $P_f$ reaches the point "b," the piston 209 contacts the spring seat 207. Under this condition, the pressure $P_f$ increases rapidly as shown by b-c. Further increase in pressure in the chamber 210-1 moves the spring 206, so that the pressure $P_f$ increases with the pressure increasing rate shown by c-d.

From the foregoing description, it will appreciated that in the load sensing valve of the present invention, upon braking the vehicle, the sealed pressure in the fluid sealing chamber under light vehicle loading is considerably lowered, and the sealed pressure under heavy vehicle loading considerably increased.

What is claimed is:

1. A load sensing valve for a hydraulic brake system for a wheeled vehicle, comprising:
    a proportioning valve for controlling hydraulic pressure in a fluid outlet port thereof in response to application of a hydraulic pressure to a fluid inlet port thereof;
    a deceleration sensing valve for changing the pressure controlling characteristic of said proportioning valve in accordance with the magnitude of a sealed hydraulic pressure in a fluid sealing chamber, the sealed hydraulic pressure being variable in accordance with the amount of deceleration of said vehicle; and compensating
    means for varying the volume of a space communicating with said fluid sealing chamber in accordance with the magnitude of the sealed hydraulic pressure at the time when the sealed hydraulic pressure is lower than a predetermined level which is corresponding to such a pressure as to cause the change of said pressure controlling characteristic of said proportioning valve, wherein said compensating means comprises a piston sealingly and axially movably received in a fixed non-expandable bore to define an expandable chamber which communicates with said fluid sealing chamber, and a spring biasing said piston to move in a direction to reduce the volume of said expandable chamber.

2. A load sensing valve as claimed in claim 1, in which said bore is defined in a cup-shaped case threaded into a bore formed in a body of said load sensing valve, and in which said spring is arranged and compressed between the bottom of said case and said piston.

3. A load sensing valve as claimed in claim 2, in which said piston has a stem extending toward said bottom of said case to limit the movement of said piston in a direction to expand said expandable chamber.

4. A load sensing valve for a hydraulic brake system for a wheeled vehicle, comprising:
    a proportioning valve for controlling hydraulic pressure in a fluid outlet port thereof in response to application of a hydraulic pressure to a fluid inlet port thereof;
    a deceleration sensing valve for changing the pressure controlling characteristic of said proportioning valve in accordance with the magnitude of a sealed hydraulic pressure in a fluid sealing chamber, the sealed hydraulic pressure being variable in accordance with the amount of deceleration of said vehicle; and
    compensating means for varying the volume of a space communicating with said fluid sealing chamber in accordance with the magnitude of the sealed hydraulic pressure at the time when the sealed hydraulic pressure is lower than a predetermined level which is corresponding to such a pressure as to cause the change said pressure controlling characteristic of said proportioning valve, wherein said proportioning valve includes a plunger which is axially movable in a direction against a spring in response to the application of the hydraulic pressure to the fluid inlet port, and wherein said deceleration sensing valve includes a piston which supports an end of said spring through a spring seat and is sealingly and axially movably received in a bore to define said fluid sealing chamber.

5. A load sensing valve as claimed in claim 4, in which said compensating means comprises a piston sealingly and axially movably received in a bore to define an expandable chamber which communicates with said fluid sealing chamber, and biasing means for biasing said piston of said compensating means to move in a direction to reduce the volume of said expandable chamber.

6. A load sensing valve as claimed in claim 5, in which said bore of said compensating means is defined in a cup-shaped case threaded into a bore formed in a body of said load sensing valve, and said biasing means is a spring arranged and compressed between the bottom of said case and said piston of said compensating means.

7. A load sensing valve as claimed in claim 6, in which said piston of said compensating means has a stem extending toward said bottom of said case to limit the movement of said piston in a direction to expand said expandable chamber.

8. A load sensing valve as claimed in claim 4, in which said compensating means comprises a piston which is sealingly and axially movably disposed in the bore of said deceleration sensing valve so as to leave said fluid sealing chamber, and a spring arranged and compressed between the piston of said deceleration sensing valve and the piston of said compensating means so as to bias these pistons in opposite directions.

9. A load sensing valve as claimed in claim 8, in which said piston of said compensating means is coaxial with said piston of said deceleration sensing valve.

10. A load sensing valve as claimed in claim 9, in which said piston of said compensating means has an axially extending through chamber through which a stem extending from the piston of said deceleration sensing valve is sealingly and movably disposed.

11. A load sensing valve as claimed in claim 4, in which said compensating means comprises a piston which has one axial end contacting with the piston of said deceleration sensing valve and the other axial end slidably passing through an opening of said spring seat, a spring arranged and compressed between said piston of said compensating means and said spring seat, and stopping means for stopping the movement of said piston of said compensating means relative to said spring seat when said piston moves by a predetermined distance.

12. A load sensing valve as claimed in claim 11, in which said stopping means is a stepped portion formed on said piston of said compensating means, said stepped portion being brought into contact with said spring seat when said piston of said compensating means moves relative to said spring seat the predetermined distance.

13. A load sensing valve as claimed in claim 11, in which said piston of said compensating means has a central bore into which a central projection of said piston of said deceleration sensing valve is received.

14. A load sensing valve as claimed in claim 13, in which a snup ring is securely mounted on the other axial end of said piston to prevent said piston of said compensating means from contacting with a body which defines the bore of said deceleration sensing valve.

15. A load sensing valve for a hydraulic brake system for a wheeled vehicle, comprising:

a proportioning valve for controlling hydraulic pressure in a fluid outlet port thereof in response to application of a hydraulic pressure to a fluid inlet port thereof;

a deceleration sensing valve for changing the pressure controlling characteristic of said proportioning valve in accordance with the magnitude of a sealed hydraulic pressure in a fluid sealing chamber, the sealed hydraulic pressure being variable in accordance with the amount of deceleration of the vehicle; and compensating means for varying the volume of a space communicating with said fluid sealing chamber in accordance with the magnitude of the sealed hydraulic pressure at the time when the sealed hydraulic pressure is lower than a predetermined level which is corresponding to such a pressure as to cause the change of said pressure controlling characteristic of said proportioning valve, wherein said proportioning valve includes a plunger which is axially movable in a direction against a spring in response to application of the hydraulic pressure to the fluid inlet port, said spring being seated on a spring seat, and wherein said deceleration sensing valve includes a piston which is sealingly and axially movably received in a bore to define said fluid sealing chamber, said piston of said deceleration sensing valve being biased by a spring to move in a direction to reduce the volume of said fluid sealing chamber, further in which said compensating means includes a flange formed on said piston of said deceleration sensing valve, said flange being brought into contact with said spring seat to compress said spring of said proportioning valve when said piston of said deceleration sensing valve moves relative to said spring seat by a predetermined distance.

* * * * *